(12) United States Patent
Estlick et al.

(10) Patent No.: US 11,960,897 B2
(45) Date of Patent: Apr. 16, 2024

(54) APPARATUS AND METHODS EMPLOYING A SHARED READ POST REGISTER FILE

(71) Applicant: Advanced Micro Devices, Inc., Santa Clara, CA (US)

(72) Inventors: Michael Estlick, Fort Collins, CO (US); Erik Swanson, Fort Collins, CO (US); Eric Dixon, Fort Collins, CO (US); Todd Baumgartner, Fort Collins, CO (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 17/389,838

(22) Filed: Jul. 30, 2021

(65) Prior Publication Data

US 2023/0034072 A1 Feb. 2, 2023

(51) Int. Cl.
*G06F 9/30* (2018.01)
*G06F 9/38* (2018.01)

(52) U.S. Cl.
CPC ........ *G06F 9/3869* (2013.01); *G06F 9/30123* (2013.01)

(58) Field of Classification Search
CPC ............................ G06F 9/30123; G06F 9/3869
See application file for complete search history.

(56) References Cited

U.S. PATENT DOCUMENTS

| 6,877,084 B1* | 4/2005 | Christie .............. G06F 9/30112 711/212 |
| 2011/0320765 A1 | 12/2011 | Karkhanis et al. |
| 2013/0339689 A1 | 12/2013 | Srinivasan et al. |
| 2021/0072991 A1 | 3/2021 | Boersma et al. |

OTHER PUBLICATIONS

Goel et al.; Shared-Port Register File Architecture for Low-Energy VLIW Processors; ACM Transactions on Architecture and Code Optimization, 2014 (Year: 2014).*
Tseng et al.; Banked Multiported Register Files for High-Frequency Superscalar Microprocessors; IEEE, 2003 (Year: 2003).*
International Search Report and Written Opinion, PCT/US2022/038246, dated Oct. 14, 2022, 11 pages.

* cited by examiner

*Primary Examiner* — Corey S Faherty (57) ABSTRACT

In some implementations, a processor includes a plurality of parallel instruction pipes, a register file includes at least one shared read port configured to be shared across multiple pipes of the plurality of parallel instruction pipes. Control logic controls multiple parallel instruction pipes to read from the at least one shared read port. In certain examples, the at least one shared register file read port is coupled as a single read port for one of the parallel instruction pipes and as a shared register file read port for a plurality of other parallel instruction pipes.

21 Claims, 4 Drawing Sheets

APPARATUS AND METHODS EMPLOYING A SHARED READ POST REGISTER FILE

BACKGROUND OF THE DISCLOSURE

Processing units that execute instructions often use register files to store data when executing instructions. A register file is an array of processor registers with fast memories, such as fast static random access memories (SRAM) with multiple ports or other suitable memory structures. For example, a typical register file stores data in functional latches that are associated with an entry that may be written to or read from in parallel through write and read ports.

Processors also employ multiple parallel instruction pipelines, also referred to as pipes that access the register file when processing executable instructions. The integrated circuit area of a register file and timing constraints of a register file are based on the number of read ports, for example, and a number of entries in the register file, among other aspects. When more read ports are added, for example, fewer entries are allowed to maintain the same area on an integrated circuit. This can result in the reduction of performance. In addition, adding more pipes with the resulting addition of more read and/or write ports also increases the area and decreases potential speed of operation using the register file. The increased size of the physical register file required for the addition of read ports and/or instruction pipes increases manufacturing costs as more microprocessor space is required to perform the operations. Performance can also be negatively impacted by the increase in size and complexity.

BRIEF DESCRIPTION OF THE DRAWINGS

The implementations will be more readily understood in view of the following description when accompanied by the below figures, wherein like reference numerals represent like elements, and wherein.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF IMPLEMENTATIONS

Briefly, a method and apparatus provide a register file port sharing structure that allows multiple instruction pipes to share one or more read ports that are coupled to other instruction pipes of the processor. In some implementations, control logic controls multiple parallel instruction pipes to read from at least one shared register file read port. In some examples a register file includes a plurality of register file read ports wherein at last one read port is configured to be shared across multiple pipes of the plurality of parallel instruction pipes and other read ports are non-shared ports. A smaller physical register file results while still allowing additional instruction pipes to be employed with the register file.

In some implementations, a processor includes a plurality of parallel instruction pipes, a register file includes at least one shared read port configured to be shared across multiple pipes of the plurality of parallel instruction pipes, and control logic controls multiple parallel instruction pipes to read from the at least one shared read port, also referred to as a shared register file read port.

In certain examples, the at least one shared register file read port is coupled as a single read port for one of the parallel instruction pipes and as a shared register file read port for a plurality of other parallel instruction pipes. In some examples, each of the multiple pipes of the plurality of parallel instruction pipes are configured to read from a plurality of non-shared read ports of the register file read ports and read from the single read port.

In certain examples, the register file includes shadow latch select logic configured to perform bit width reconfiguration for a group of nonshared read ports and the at least one shared read port, based on an instruction bit width being different from a register bit width of the register file.

In some examples, register file bypass logic is coupled to the multiple pipes of the plurality of parallel instruction pipes that share the at least one shared read port, and feeds a result generated by one of the plurality of parallel instruction pipes to an input of another of the plurality of parallel instruction pipes.

In certain examples, a first instruction pipe includes a first plurality of non-shared read ports and a second instruction pipe includes a second plurality of non-shared read ports and the first and second instruction pipes share a first register file read port of a third instruction pipe.

In some examples, control logic performs instruction based port sharing by making one of either the first or second pipes available to use the shared read port of the third instruction pipe based on a multi-source operand instruction being eligible for use with non-shared and shared read ports.

In certain examples, the control logic performs read port sharing by flipping use of the first and second pipes if both pipes are eligible to process a multi-source operand instruction using non-shared and shared read ports.

In some examples, the control logic performs read port sharing by directing frequently used multi-source operand instructions on the first pipe and infrequent multiple source operand instructions on the second pipe.

In certain examples, a first group of instruction pipes are configured to share a first register file read port of another pipe and a second group of instruction pipes are configured to share a second register file read port of another pipe.

In some examples, the control logic invalidates an instruction picked for the one of the instruction pipes in response to a read conflict of the shared read port with multiple other pipes of the plurality of parallel instruction pipes that share the shared read port.

In certain implementations, a processor includes a floating point unit including a plurality of parallel instruction pipes, a register file including a plurality of register file read ports wherein multiple read ports are configured to be shared across multiple pipes of the plurality of parallel instruction pipes and other register file read ports are configured as non-shared read ports that are dedicated to a respective instruction pipe, and control logic, coupled to the register file, and configured to control multiple parallel instruction pipes to read from the multiple shared register file read ports and the non-shared register file read ports.

In some examples, the processor includes a first group of instruction pipes includes at least a first shared register file read port coupled as a single read port for a first parallel instruction pipe and as a shared register file read port for a first plurality of parallel instruction pipes also coupled to non-shared register file read ports, and a second group of instruction pipes including at least a second shared register file read port coupled as a single read port for a second parallel instruction pipe and as a shared register file read port for a second plurality of parallel instruction pipes also coupled to non-shared register file read ports.

In certain examples, shadow latch select logic performs bit width reconfiguration for at least the first group of instruction pipes, based on an instruction bit width being different from a register bit width of the register file.

In some implementations, a method for instruction execution using a register file includes receiving one or more multi-source operand instructions for execution, and controlling execution of the one or more multi-source operand instructions by controlling multiple parallel instruction pipes to read from the at least one shared register file read port of a register file and read from non-shared register file read ports of the register file wherein the at least one shared register file is also coupled to a parallel instruction pipe different from the multiple parallel instruction pipes.

In certain examples, performing instruction based port sharing by making one of either a first or second parallel instruction pipes of the multiple instruction pipes available to use the shared read port of a third instruction pipe based on a multi-source operand instruction being eligible for use with non-shared and shared read ports.

In some examples, the method includes performing read port sharing by flipping use of a first instruction pipe and a second instruction pipe if both pipes are eligible to process a multi-source operand instruction using non-shared and shared register file read ports.

In certain examples, the method includes performing read port sharing by directing frequently used multi-source operand instructions on the first pipe and infrequent multiple source operand instructions on the second pipe.

In some examples, the method includes invalidating an instruction picked for the parallel instruction pipe different from the multiple parallel instruction pipes in response to a read conflict of the shared read port with the multiple other pipes of the plurality of parallel instruction pipes that share the shared read port.

In certain examples, the method includes performing bit width reconfiguration for a group of nonshared read ports and the shared read port, based on an instruction bit width being different from a register bit width of the register file.

Figure 1:
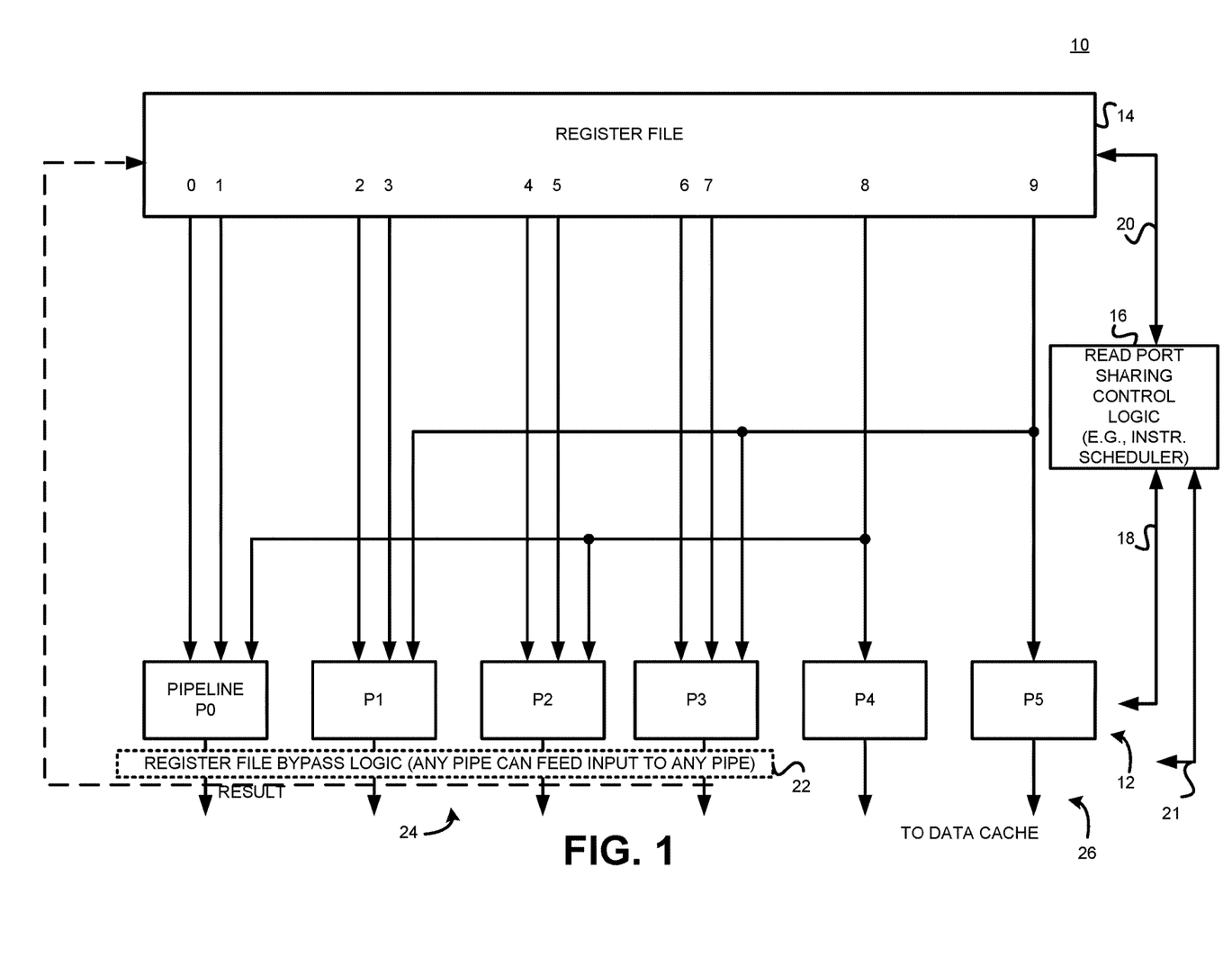
FIG. 1 is a block diagram illustrating a processor in accordance with an example set forth in the disclosure.

FIG. 1 illustrates a portion of a processor 10 that includes a plurality of parallel instruction pipes generally shown as pipes 12. The processor 10 in some implementations is a multi-core central processing unit (CPU), a multi-core graphics processing unit (GPU), a combination thereof or any suitable processor. In this example, there are six instruction pipes, namely P0-P5. A register file 14 includes register file read ports 0-9 for purposes of illustration. In this example, read port 8 is configured to be shared across multiple pipes of the parallel instruction pipes 12 and in particular, is coupled to pipe P0 and P2. Register file read port 8 is also coupled to pipe P4. In some implementations, the processor 10 is a floating point unit in a processor core.

Similarly, register port 9 is also configured to be shared across multiple pipes of the parallel instruction pipes 12 and in this example, is coupled to pipe P1 and P3. Register file read port 9 is also coupled to instruction pipe P5. Register file read ports 0, 1 are non-shared register file read ports for pipe P0, register file read ports 2 and 3 are non-shared register file read ports for pipe P1, read ports 4 and 5 are non-shared read ports for pipe P2 and read ports 6 and 7 are non-shared read ports for pipe P3. Among other technical benefits, the shared read ports allow additional entries to be placed in the register file of a same size compared to designs that require dedicated read ports for all pipelines. Read ports are expensive to implement and as such, the addition of multiple dedicated ports can reduce the area for entries in constrained designs and the cost.

Pipes P0-P3 are configured as shown to read from non-shared respective read ports 0-7 and also the shared register file read ports 8 and 9 respectively which are single read ports for pipelines P4 and P5 respectively. Shared register file read ports 8 and 9 are each coupled as a single read port for instruction pipe P4 and P5 respectively and as shared register file read ports for other parallel instruction pipes. For example, shared read port 8 for instruction pipe P4 is shared with pipes P0 and P2 while shared port 9 is a shared register read port for instruction pipes P1 and P3. It will be recognized that any suitable number of pipes and shared read ports may be employed as desired.

In this example, each of pipes P0-P3 are configured to use three read ports and thus, are able to process multi-source instructions with up to three operands. Pipes P4 and P5 in contrast are configured to only access a single read port and thus only execute single operand microinstructions. The example shown illustrates ten register file read ports (0-9) and fourteen path sources for instructions.

The processor 10 employs control logic 16, also referred to as read port sharing control logic and in some examples, is implemented as one or more state machines in an instruction scheduler. However, the control logic 16 may be configured in any suitable manner and may be stand-alone logic or employed in other functional blocks of the processor as desired. The control logic 16 controls the parallel instruction pipes P0-P3 to read from a shared register file read port 8 and/or 9 in some implementations. Control information is shown by arrows 18. The control logic 16 also controls shadow latch operation as further described below shown by shadow control information 20. Stated another way, pipes P1 and P3 steal the read port 9 from P5, and pipe P0 and P2 steal read port 8 from P4 when needed.

The processor in some implementations includes pipeline bypass logic 22 that allows the result from any pipe P0-P3, for example, to serve as an input to another of the pipes P0-P3. For example, if a result is not to be stored in the register file 14, the result bypasses the register file and is routed to the appropriate pipe through the pipeline bypass logic 22. In some implementations, the register file bypass logic 22 employs a two-cycle bypass and the differing pipes P0-P3 can feed any input to any of the other pipes P0-P3. The control logic 16 provides bypass control information 21 to control the bypass control logic 22 as needed. However, any suitable bypass configuration and control configuration may be employed as recognized by those skilled in the art.

In this example, pipes P0-P3 have two physical register file read ports and are configured to a shared register file port. Pipes P0-P3 are controlled to do bypass operations and to write to the physical read file. In some implementations, pipes P4 and P5 have one physical register file read port and this example, do not have register file bypass logic. For example, pipelines P0-P3 output results generally shown as 24 to either the register file 14, to a data cache or other memory and/or to other pipelines. Pipes P4 and P5 in contrast in some examples do not include the bypass logic and do not provide results to the register file 14 but instead provide results outside to one or more data caches or other processors indicated as 26. However, it will be recognized that any suitable operation may be employed by any of the requisite instruction pipes as desired.

The register file bypass logic 22 is coupled to the multiple parallel instruction pipes P0-P3 in this example. The control logic, in some implementations is in an instruction scheduler, and is configured to allow bypassing and only reads are restricted in some implementations. In some implementations the control logic puts frequently bypassed source operands on shared pipes P4 or P5 instead of pipes P0-P3.

The parallel instruction pipes share at least one shared read port. For example, pipes P0 and P2 share read port 8 whereas pipes P1 and P3 share read port 9. The register file bypass logic 22 feeds a result generated by one of the parallel instruction pipes P0-P3, to an input of another of the plurality of parallel instruction pipes P0-P3 depending on the instruction being executed.

As illustrated, each of the pipelines P0-P3 access certain non-shared read ports 0-7 as shown. For example, non-shared read ports 0 and 1 are coupled to P0 whereas non-shared read ports 2 and 3 are coupled to pipe P1 and so on. The instruction pipes P0-P3 also share a register file read port 8 and/or 9 of another instruction pipe P4 or P5 as shown. The control logic 16 performs instruction based read port sharing by making, for example, pipes P0 and P2 (even pipe group) available to use shared read port 8 of pipe P4 based on a multi-source operand instruction being eligible for use with non-shared read ports 0, 1, and/or 4, 5 and shared read port 8. Likewise, control logic 16 performs instruction based read port sharing by making, for example, P1 or P3 (odd pipe group) available to use shared port of instruction pipe P5 based on a multi-source operand instruction being eligible for use with read ports 2, 3 and/or 6 and 7. For example, the control logic 16 tracks which instructions have, in this example, three source operand instructions and are eligible for execution. The control logic 16 makes the eligible multi-source instruction available for execution to the appropriate pipe.

In one example, the multi-source instruction may be, for example, read execute write instructions such as three read execute write operations as follows:
RD|EX|WR
　RD|EX|WR
　　RD|EX|WR.

Because multiple pipes are coupled to a same shared register file read port, in some examples, the control logic 16 flips use of pipes if both pipes are eligible to process multi-source operand instruction that uses non-shared and shared read ports. For example, if pipelines P0 and P2 are both eligible to process a multi-source operand instruction, the control logic 16 will flip between pipes P0 and P2 as instructions become eligible. In other implementations, the control logic 16 operates to perform read port sharing by directing frequently used multi-source operand instructions on pipe P0 and infrequent multi-source operand instructions on P2. The level of frequency is set in some examples by a programmable control register that stores a frequency threshold so that after the threshold is reached, the control logic 16 uses the other pipeline that shares the same shared register file read port.

In this example, the processor 10 has the pipelines and register file configured such that a first group of instruction pipes P0 and P2 (even group) are configured to share the register file read port 8 of port P4 and a second group of instruction pipes P1 and P3 (odd group) are configured to share a register file read port 9 of another pipe P5. In some implementations this allows faster operation compared to a system that employed all pipes that shared the same read ports. However, it will be recognized that any suitable architecture may be employed.

In some implementations, the control logic 16 invalidates an instruction that is picked for one of the instruction pipes P4 or P5 and responds to a read conflict of a shared read port such as read port 8 and read port 9. For example, if an instruction has been issued for pipe P4 but another multi-source instruction is eligible for pipe P0, the control logic 16 will kill the instruction destined for pipe 4 in favor for the multi-source instruction for pipeline P0 that needs the shared read port 8. It will be recognized that in some implementations, one instruction can be processed by a given pipeline at a time so that, for example, pipelines in the same group cannot execute instructions using the shared read port at the same time so that P0 and P2, for example, cannot both share the read port 8 at the same time.

The processor 10 may be any suitable processor and in some examples, is a processor that employs a processing core that employs a floating point unit wherein the register file 14 is a floating point register file. In some examples, the instruction pipes 12 are configured to execute single instruction multiple data (SIMD) instructions and other types of instructions if desired as further described below.

Figure 2:
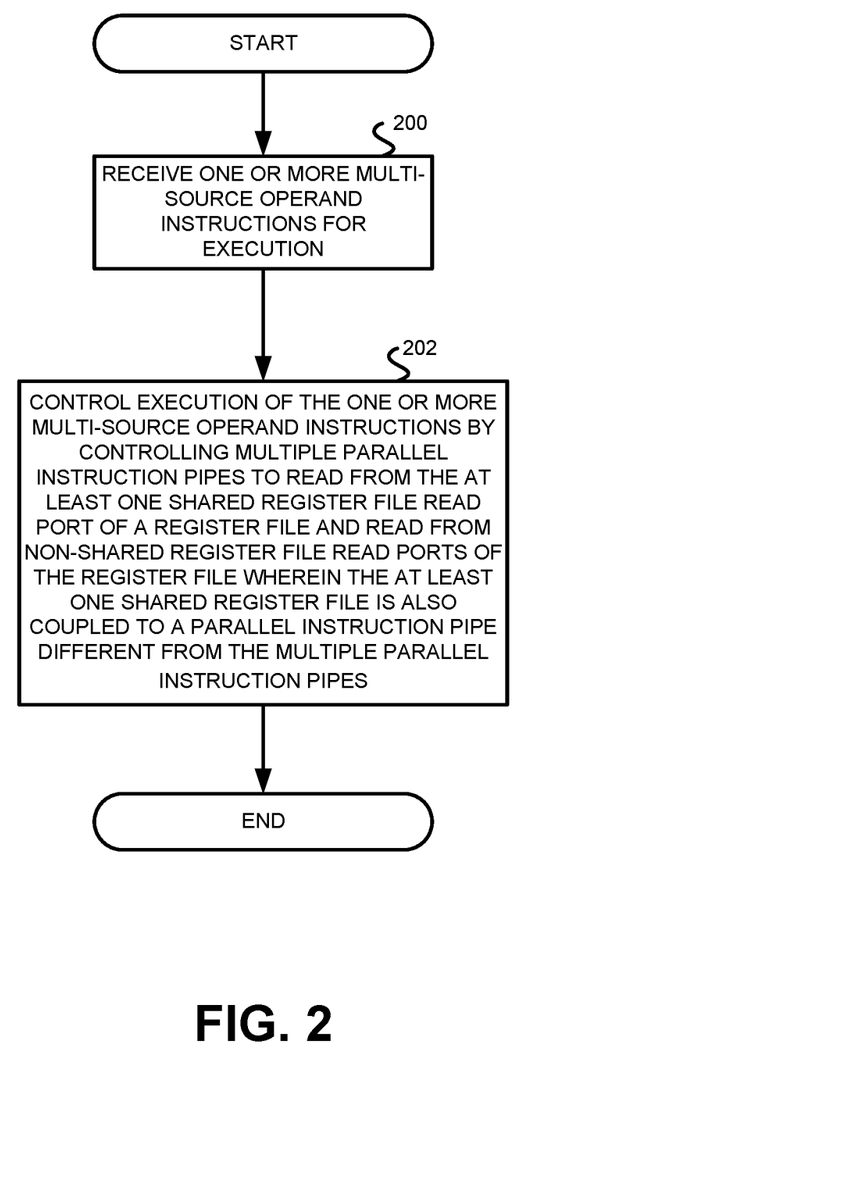
FIG. 2 is a method for instruction execution using a register file in accordance with an example set forth in the disclosure.

Referring also to FIG. 2, a method instruction execution using register file 14 that employs shared read ports among instruction pipes will be described with reference to FIG. 1. However, any suitable structure may be employed and the order of operations may also be changed as desired. As shown in block 200, the method includes receiving one or more multi-source operand instructions for execution, such as by the control logic 16 which in some implementations is an instruction scheduler unit. As shown in block 202, the method includes controlling execution of the one or more multi-source operand instructions by controlling multiple parallel instruction pipes such as P0 and P2 in one example, to read from a shared register file read port 8 and from non-shared register file read ports 0 and 1, when pipe P0 is selected. The shared register file 8, for example, is also coupled to the parallel instruction pipe P4 as well as parallel instruction P2.

When picking an instruction to kill for port sharing, the control logic 16 (e.g., scheduler) will in some implementations pick port 0 or 2 to execute multi-source instructions while killing the instruction picked on pipe P4. For example, if the read port 8 for pipe 4 micro operation is stolen by either pipe 0 or pipe 2 for use as a third operand source, the pipe 4 micro operation can only be allowed to proceed in the event that it can get its operand from the bypass network. If the register file port must be used, the pipe 4 micro op pick is killed.

Figure 3:
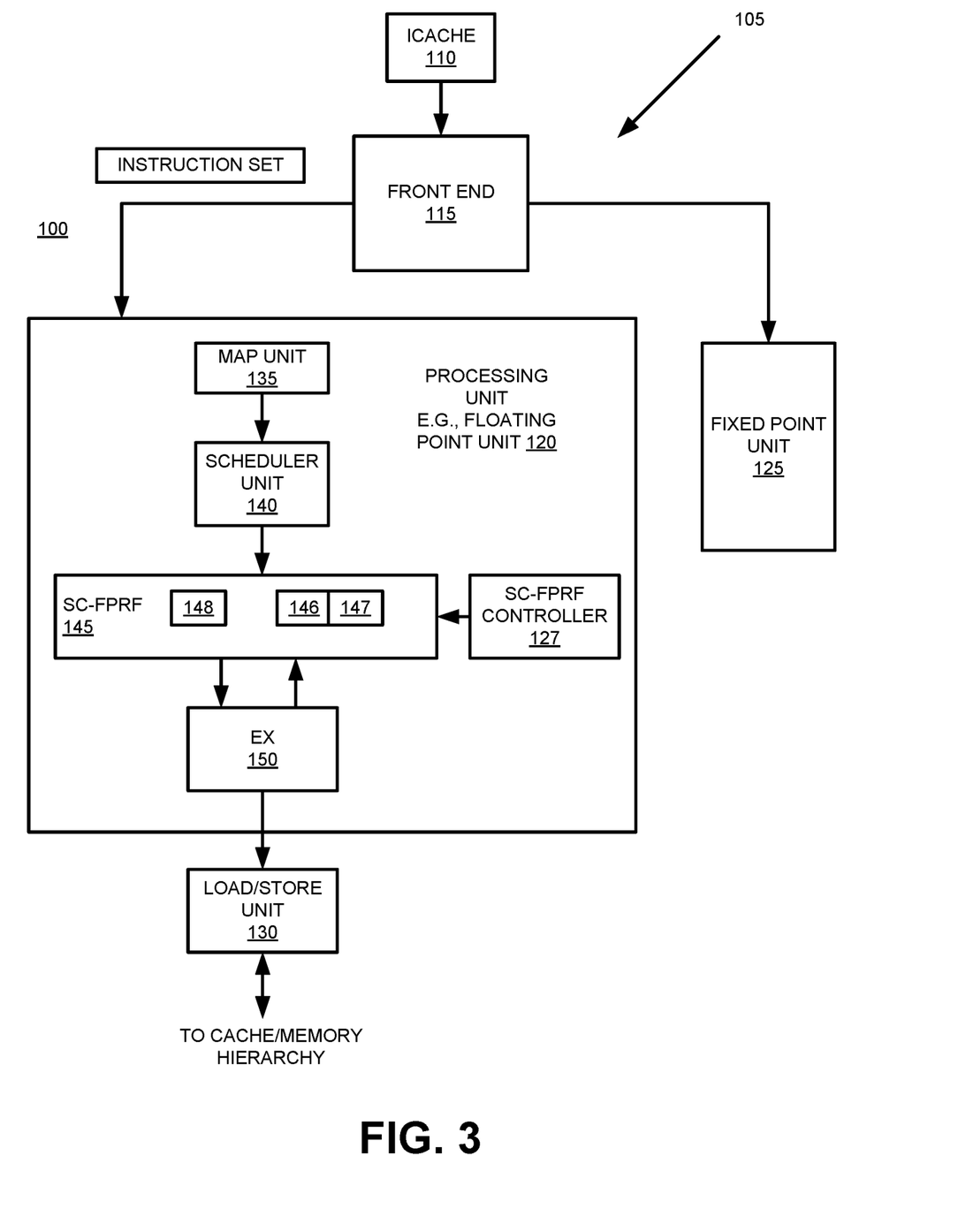
FIG. 3 is a block diagram illustrating a processor in accordance with one example set forth in the disclosure.

FIG. 3 illustrates one example of a processor that employs shadow select register usage as further described below and provides shadow select logic sharing. The processor 100 supports bit width reconfiguration of registers in a processor core of a processor in accordance with some embodiments. In order to access the data stored in the functional latches, typical processors utilize split renaming in order to "split" registers into high bit registers and low bit registers. Split-renaming allows the processor to implement registers wider than the native width of the processor. In particular, the high bit portion of a register and low bit portion of the register are assigned different identifiers, or names, by the microprocessor, so that the register is logically treated as two different registers. For example, several currently available microprocessors split rename 256-bit registers into a high 128-bit register and a low 128-bit register. Split renaming registers into high and low registers results in an increase in the amount register space required to perform computational operations. For example, split renaming the 256-bit register described above into high and low 128-bit registers requires twice the number of entries and area in the physical register file. The increased size of the physical register file required for split renaming results in an increase in manufacturing costs as more microprocessor space is required to perform the split renaming operations.

Accordingly, in some implementations, the processor 100 employs shadow latch structures that are multiplexed in to accommodate larger bit width registers. For example, a shadow-latch configured floating point register file is used that reconfigures a bit width from a first bit width (e.g., 256-bit width) to a second bit width (e.g., 512-bit width) based on the availability of shadow latches in the shadow-latch configured floating point register file, so that the floating point unit that operates at the first bit width is usable in a processor that operates at a second bit width. The shadow-latch configured floating point register file includes shadow latches, regular latches, and shadow select multiplexers (MUXs) (see e.g., FIG. 4) that are used for bit width reconfiguration during, for example, read and write data operations that utilize the floating point unit.

By way of example, in order to perform the bit width reconfiguration, during a first and second clock cycle operation, the first 256-bits of the 512-bit operation are stored in the regular latches and the second 256-bits are stored in the shadow latches within the shadow-latch configured floating point register file of the same single entry. During, for example, a 512-bit read or write operation, the first 256-bits are accessed from the shadow-latch configured floating point register file during a first clock cycle and the second 256-bits are accessed during a second clock cycle, where both accesses occur from the same entry. Because both the first 256-bits and the second 256-bits are stored in a single entry in the shadow-latch configured floating point register file, split-renaming is not required in order to reconfigure the bit width for 512-bit operation.

In some embodiments, the illustrated processor 100 includes, for example, a central processing unit (CPU) core based on an x86 instruction set architecture (ISA), an ARM ISA, and the like. The processor implements a plurality of such processor cores, and the processor is implemented in one of a variety of electronic devices, such as a notebook computer, desktop computer, tablet computer, server, computing-enabled cellular phone, personal digital assistant (PDA), set-top box, game console, and the like.

In some embodiments, the processor utilized for processor 100 supports the x86 architecture that supports execution of two types of vector arithmetic instructions: Streaming Single Instruction Multiple Data (SIMD) Extensions (SSE) instructions and Advanced Vector eXtension (AVX) instructions. AVX instructions manipulate 256-bit operands and SSE instructions manipulate 128-bit operands. AVX-512 instructions are 512-bit extensions to the 256-bit AVX SIMD instructions for x86 instruction set architecture (ISA). Accordingly, a processor that employs a register file with 512-bit registers supports execution of both AVX and SSE instructions. In some embodiments, utilizing a shadow-latch configured floating point register file, a processor or processing unit (such as the floating point unit 120) that employs a register file with 256-bit registers, also supports 512-bit operations.

In the depicted example, the execution pipeline 105 includes an instruction cache 110 ("Icache"), a front end 115, floating point unit 120, and fixed point unit 125 (also commonly referred to as "integer execution units"). The processor 100 also includes a load store unit (LSU) 130 coupled to a memory hierarchy (not shown), including one or more levels of cache (e.g., L1 cache, L2, cache, etc.), a system memory, such as system RAM, and one or more mass storage devices, such as a solid-state drive (SSD) or an optical drive.

The instruction cache 110 stores instruction set data that is fetched by a fetch unit (not shown) of the front end 115 in response to demand fetch operations (e.g., a fetch to request the next instruction in the instruction stream identified by the program counter) or in response to speculative prefetch operations. The front end 115 decodes instructions fetched by the fetch unit into one or more operations that are to be performed, or executed, by either the floating point unit 120 or the fixed point unit 125. Those operations involving floating point calculations are dispatched to the floating point unit 120 for execution, whereas operations involving fixed point calculations are dispatched to the fixed point unit 125.

As used herein, a type of instruction refers to a size of the operands manipulated by the instruction. Thus, instructions of different types manipulate operands of different sizes. For example, in some embodiments the floating point unit 120 executes operations decoded from instructions that manipulate 128-bit operands (referred to as 128-bit instructions) and also executes operations decoded from instructions that manipulate 256-bit operands (referred to as 256-bit instructions). In addition, floating point unit 120, utilizing the bit width reconfiguration techniques described herein, executes operations decoded from instructions that manipulate 512-bit operands (referred to as 512-bit instructions).

In some embodiments, the floating point unit (FPU) 120 includes a map unit 135, a scheduler unit 140, a shadow-latch configured floating point register file (SC-FPRF) 145, and one or more execution (EX) units 150. In some embodiments, FPU 120 carries out operations on floating point numbers and performs operations including addition, subtraction, multiplication, division, square root, and bit shifting or broadcasting, as well as transcendental functions such as exponential functions, trigonometric functions, and the like. In various embodiments, the FPU 120 supports operation of various graphics processing units (GPUs) and central processing units (CPUs). For example, if the CPU encounters an instruction that requires performing a floating-point operation, the CPU transmits a request to the FPU 120, which carries out the operation and returns the results to the CPU. Although the FPU 120 shown is implemented internally to the processor 100, in other embodiments FPU 120 is implemented externally to the GPU and the CPU.

The SC-FPRF 145, includes the read port structure shown in FIG. 1 and utilize the additional shadow latches 147 and shadow select MUXs 148, and stores instructions, operands used by the instructions, and results of executed instructions. In some implementations, the FPU 120 uses the pipeline structure and register file structure of FIG. 1. Entries in the SC-FPRF 145 are indicated by physical register numbers. In some embodiments, the physical register numbers are mapped (or renamed) using map unit 135 to architectural register numbers that are defined by an instruction set architecture. Typically, a queue entry maintained by the scheduler unit 140 includes a field to store the operation payload or operation identifier (e.g., the opcode for the operation), fields for the addresses or other identifiers of physical registers that contain the source operand(s) for the operation, fields to store any immediate or displacement values to be used with the operation, a destination field that identifies the physical register in which the result of the execution of the corresponding operation is to be stored, and at least one field to store instruction dependency information. For example, a load instruction includes address information indicating the target of the load instruction and an architected register operand indicating the PRN in the SC-FPRF 145 that receives the data from the target address.

In addition to operating on instructions that operate at a first bit width (256-bit width), the FPU 120 operates on instructions that operate at a second bit-width that include a relatively large number of bits, e.g., on 512-bit instructions. That is, in some embodiments, even though the datapaths of FPU 120 are limited to 256-bit instructions, FPU 120 is able to utilize the SC-FPRF 145 to reconfigure the 256-bit datapath to operate on 512-bit instructions by extending the instruction operation or transaction from a single clock cycle to two clock cycles (e.g., a first clock cycle and a second clock cycle). Thus, in some embodiments, when the SC-FPRF 145 is a 512-bit register file (i.e., stores the lower 256 bits in storage latches 146 and the upper 256 bits in the shadow latches 147), access to the 512 bits occurs over two 256-bit cycles, instead on one 512-bit cycle.

In some embodiments, for example, during a read operation, when the execution units 150 read data from the SC-FPRF 145, the lower 256 bits are read from the storage latches 146 in the first cycle of the transaction and the upper 256-bits are read from the shadow latches 147 in the second cycle of the transaction. Using a read address provided to the shadow select MUXs 148, the shadow select MUXs 148 utilize a read function to select which shadow latch of the shadow latches 147 to read during the second cycle of the read operation. In some embodiments, in order to perform the read operation, the read function is added to the SC-FPRF 145 that is used to determine whether to read the shadow data stored in the shadow latches or the normal data stored in the regular latches. Thus, the read function allows the execution units 150 to select the data to read using the shadow select MUXs 148.

Similarly, during a write operation, when either the schedule unit 140 or the execution units 150 perform a write operation to SC-FPRF 145, the lower 256 bits are written to the storage latches 146 during the first cycle of the transaction and the upper 256 bits are written to the shadow latches 147 during the second cycle of the transaction. During the write operation, no additional write logic is required compared to traditional register files because the additional 256 bits that are being written are not being written as a separate entry, i.e., the additional 256 bits are a shadow piece of data associated with the regular latches in the same entry.

In some embodiments, at the input to the interface to SC-FPRF 145, a write control signal and a read control signal are provided from a SC-FPRF controller 127 that dictates whether the read operation or the write operation is going to occur during the second cycle. The SC-FPRF controller is in some implementations included in the control logic 16. During the write operation, if a write control signal (e.g., Is512 write control input signal) provided from SC-FPRF controller 127 is set to a high logic value when the transaction starts, the clock for the shadow write is activated during the second cycle. That is, the Is512 write control input signal causes the shadow write clock to fire in the second cycle of the two cycles. For a read operation, when a read control signal (e.g., Is512 read control input signal) provided from SC-FPRF controller 127 is set to a high logic value when the transaction starts, the shadow select MUX 148 selects the shadow latch to be read based upon the read address provided to the shadow select MUX 148 during the second cycle. That is, the Is512 read control input signal causes the shadow select MUX 148 to choose the shadow latch 147 corresponding to the requested address for reading in the second cycle. In other words, in the second cycle of the transaction data from the shadow latch 147 is selected by the shadow select MUX 148. As a result of using the SC-FPRF 145, in various embodiments, the read decoders and the write decoders are not clocked for the second cycle, holding the decoded values steady and saving power while executing instructions in processor 100.

In some embodiments, since the control signal for the shadow select MUX 148 arrives ahead of schedule, i.e., within the first cycle of the transaction, the signal provided to the shadow select MUX (i.e., a shadow select MUX signal) provided by, for example, a flip flop, hides the timing associated with adding the additional shadow select MUX 148, essentially nullifying the effect of having to switch the additional shadow select MUX 148 that has been added to the register file.

In some embodiments, activation of FPU 120 for 512-bit operations or 256-bit operations is dependent on the configuration of SC-FPRF controller 127. When the micro-operation to be executed is a 512-bit instruction, then SC-FPRF controller 127 enables the FPU 120 for 512-bit operations. When the micro-operation to be executed is a 256-bit instruction, then SC-FPRF controller 127 enables the FPU 120 for 512-bit operations. That is, in order for the FPU 120 to determine whether a 512-bit operation or 256-bit operation is to occur, SC-FPRF controller 127 activates the FPU 120 as either a 512-bit operator or a 256-bit operator. When the FPU 120 is not enabled for 512-bit read or write operations, a 256-bit read or write operation is activated and occurs in a single cycle. When the FPU 120 is enabled for 512-bit read or write operations, 512-bit read or write operation is activated and it takes two clock cycles on a given port to do the 512 operation.

In some embodiments, since FPU 120 is a 256-bit wide FPU with two cycles of 256-bits being used to execute the 512-bit operation, scheduler unit 140 in FPU 120 blocks acceptance of a second micro-op during the second cycle in order to allow the first micro-op to complete during the first and second cycle. That is, since execution of the 512-bit operation by FPU 120 takes two cycles, scheduler unit 140 in FPU 120 is flagged by SC-FPRF controller 127 that the 512-bit micro-op s take two cycles and prevents another micro-op or another transaction from commencing during the second cycle.

Similarly, load store unit 130 operates in both 512-bit operations and 256-bit operations. Load store unit 130 is flagged by SC-FPRF controller 127 that FPU 120 is executing 512-bit micro-ops. As load store unit 130 handles the 512-bit loads and store with internal 256-bit datapaths, the lower 256-bits of the 512-bit operation are executed during the first cycle and the upper 256-bits are executed during the second cycle, matching the SC-FPRF 145 and execution pipes. Thus, in some embodiments, both the load store unit 130 interface and the FPU 120 interface are 256-bits wide.

In some embodiments, executing 512-bit micro-ops in FPU 120 allows 512-bit instructions to use a single entry in the retire queue (not shown) and many other structures in processor core 100, such as, for example, a load queue, and a scheduler in EX unit 150. Using a single entry improves performance over, for example, split renaming, which splits 512-bit instructions into two 256-bit micro-ops. In some embodiments, the shadow-latch configured floating point register file scheme described herein is extended to multiple latches and cycles, such as, four latches and four cycles to perform 512-bit operations with 128-bit datapaths.

In order to use the SC-FPRF 145 to implement 512-bit renaming and 512-bit micro-ops, with 256-bit datapaths, in addition to the regular latches that normally used store data in a register file, and an additional set of shadow latches are added per entry in the register file. Further, a second write clock is added to the floating point unit 120 to allow the shadow latch to be written to.

The scheduler unit 140 schedules instructions for execution in the FPU 120. In addition, because the SC-FPRF 145 uses two cycles to perform a single cycle operation, scheduler unit 140 is adapted to accommodate for the additional cycle needed to perform the two cycle operation. As a result, scheduler unit 140 in the floating point unit 120 blocks or delays accepting another micro-op for an additional cycle, until the two cycle operation has completed. That is, in one embodiment, scheduler unit 140 understands that 512-bit micro-ops take two cycles and block taking another micro-op or another transaction in that second cycle. In some embodiments, the floating point unit 120 also requires the scheduler (scheduler unit 140) to discern that 512-bit micro-op s take two cycles in the register file and execution pipelines.

Load store unit 130 performs load and store operations over two cycles instead of a single cycle in order to adjust for the additional cycle added for the shadow latch operations. Thus, for example, for a 512-bit operation, the load store unit 130 performs 512-bit loads and stores with 256-bit data paths over two cycles, instead of a single cycle.

In various embodiments, although the FPU 120 performs its entire operations using 256-bit datapaths, the decoder (not shown) decodes the 512-bit operation using 512-bit datapaths, instead of 256 bits. In other words, the decoder is not aware that the FPU 120 operates using a 256-bit datapath, and instead performs as the decoder normally would for a 512-bit operation.

In some embodiments, the shadow select multiplexer signal is output by a local flip-flop, since the shadow select multiplexer signal comes along with the first cycle transaction. In some embodiments, outputting the shadow select multiplexer signal from the local flip-flop allows the processor to be faster than the read decode, and hides the timing through the extra or additional shadow select multiplexer.

Although the following description is related to a shadow-latch configured floating point register file 145 that is implemented in the floating point unit 120, it applies to any type of register file or shadow-latch configured register file that is implemented for, for example, the fixed point unit 125, or an entirely different type of processing unit, such as a digital signal processor, a graphics processor, an application specific integrated circuit (ASIC), etc. The SC-FPRF 145 includes functional latches, shadow latches and shadow select multiplexers that allow data to be read to and written from the functional latches and shadow latches.

Figure 4:
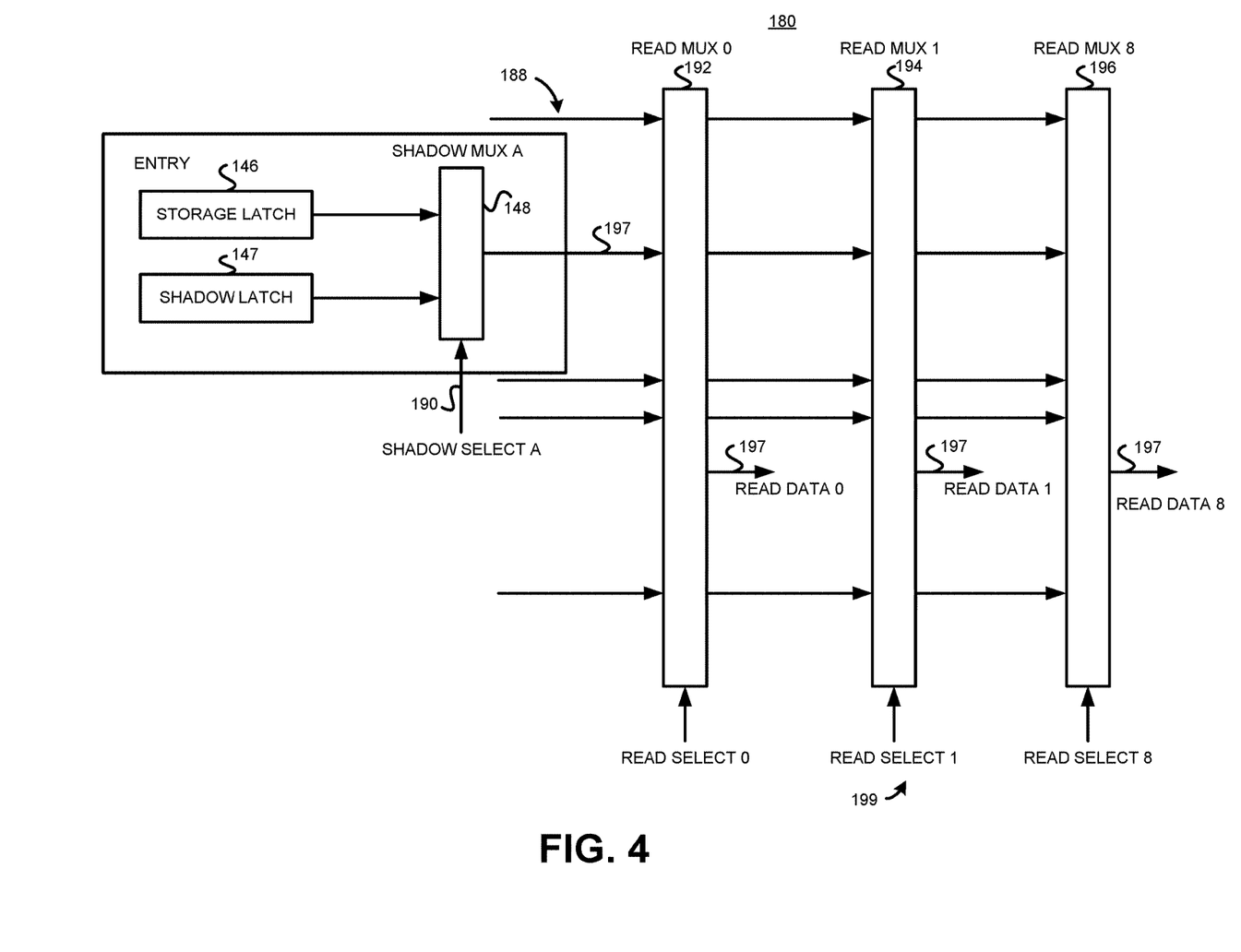
FIG. 4 is a block diagram illustrating one example of a processor employing shadow latch structure in a register file in accordance with one example set forth in the disclosure.

FIG. 4 illustrates shadow latches in use with the read ports 0, 1 and shared read port 8 of pipe P4 used in pipe P0 as shown in FIG. 1. In this example, a single shadow latch entry uses shadow select A information 190 (an example of control information 20) and shadow mux A 148 to select between storage latches 146 and 147 for ports 0, 1, and 8. Thus, the shadow select information and mux is shared across these three ports.

Shadow latch select logic 180 employs for each entry if desired, storage latch 146 and shadow latch 147 that are multiplexed through the shadow multiplexer 148. Although not shown, the storage latch, shadow latch and shadow mux are repeated for each read port as illustrated by arrows 188. The shadow multiplexer 148 is controlled by shadow select A information 190 to select between the storage latch or shadow latch depending upon the bit width needed fora register bit width needed.

In this example, for pipe P0, a read multiplexer 192 is coupled to receive the output of the shadow mux 148, as well as read mux 194 and read mux 196 for the respective read ports of pipe P0 (FIG. 1). The output from the shadow mux 148 shown as 197 is selected by the control logic 16 through read select data 199 such that any of the read multiplexers 192-196 can select the output of shadow mux 148. As such, the shadow multiplexer 148 is shared among multiple read port muxes such as read mux 0, 1 and 8 192-196.

As shown, there is a single shadow select mux 148 in the register entries that feeds multiple read port muxes 192-196. For example, read port 0 and 1 are forced to have the same shadow select mux as well as read mux 8. There can be other shadow multiplexers as previously noted. The shadow muxes in some implementations can have one or more read muxes attached. In some implementations, all read muxes that share a shadow mux are forced to have the same shadow alignment. For example, the storage latch 146 holds (255:0) of a register and the shadow latch 147 holds (511:256). All read ports sharing a shadow select then have to have the same alignment of data, either (255:0) or (511:256).

Although features and elements are described above in particular combinations, each feature or element can be used alone without the other features and elements or in various combinations with or without other features and elements. The apparatus described herein in some implementations use software or firmware incorporated in a non-transitory computer-readable storage medium for execution by a general-purpose computer or a processor. Examples of computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

In the preceding detailed description of the various embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized, and that logical, mechanical and electrical changes may be made without departing from the scope of the invention. To avoid detail not necessary to enable those skilled in the art to practice the invention, the description may omit certain information known to those skilled in the art. Furthermore, many other varied embodiments that incorporate the teachings of the disclosure may be easily constructed by those skilled in the art. Accordingly, the present invention is not intended to be limited to the specific form set forth herein, but on the contrary, it is intended to cover such alternatives, modifications, and equivalents, as can be reasonably included within the scope of the invention. The preceding detailed description is, therefore, not to be taken in a limiting sense, and the scope of the present invention is defined only by the appended claims. The above detailed description of the embodiments and the examples described therein have been presented for the purposes of illustration and description only and not by limitation. For example, the operations described are done in any suitable order or manner. It is therefore contemplated that the present invention covers any and all modifications, variations or equivalents that fall within the scope of the basic underlying principles disclosed above and claimed herein.

The above detailed description and the examples described therein have been presented for the purposes of illustration and description only and not for limitation.

What is claimed is:

1. A processor comprising:
   a plurality of parallel instruction pipes;
   a register file comprising at least one shared register file read port configured to be shared across the plurality of parallel instruction pipes; and
   control logic, operatively coupled to the register file, and configured to control the plurality of parallel instruction pipes to read from the at least one shared register file read port,
   and wherein at least one of the plurality of parallel instruction pipes are configured to read from a plurality of non-shared register file read ports of the register file and read from the at least one shared register file read port.

2. The processor of claim 1 wherein the at least one shared register file read port is coupled as a single read port for one of the plurality of parallel instruction pipes and as a shared register file read port for a plurality of other parallel instruction pipes.

3. The processor of claim 1 wherein the register file comprises shadow latch select logic configured to perform bit width reconfiguration for a group of nonshared read ports and the at least one shared register file read port, based on an instruction bit width being different from a register bit width of the register file.

4. The processor of claim 1 comprising register file bypass logic coupled to the plurality of parallel instruction pipes that share the at least one shared register file read port, and operative to feed a result generated by one of the plurality of parallel instruction pipes to an input of another of the plurality of parallel instruction pipes.

5. The processor of claim 1 wherein a first instruction pipe of the plurality of parallel instruction pipes is coupled to a first plurality of non-shared read ports and a second instruction pipe of the plurality of parallel instruction pipes is coupled to a second plurality of non-shared read ports and the first and second instruction pipes share a register file read port that is also coupled to a third instruction pipe of the plurality of parallel instruction pipes.

6. The processor of claim 5 wherein the control logic is operative to perform instruction based port sharing by making one of either the first or second instruction pipes available to use the shared register file read port of the third instruction pipe based on a multi-source operand instruction being eligible for use with non-shared and shared read ports.

7. The processor of claim 5 wherein the control logic is operative to perform read port sharing by flipping use of the first and second instruction pipes if both pipes are eligible to process a multi-source operand instruction using non-shared and shared read ports.

8. The processor of claim 5 wherein the control logic is operative to perform read port sharing by directing frequently used multi-source operand instructions on the first instruction pipe and infrequent multiple source operand instructions on the second instruction pipe.

9. The processor of claim 1 wherein a first group of instruction pipes are configured to share a first register file read port of a first different pipe and a second group of instruction pipes are configured to share a second register file read port of a second different pipe.

10. The processor of claim 2 wherein the control logic is operative to invalidate an instruction picked for one of the plurality of parallel instruction pipes in response to a read conflict of the shared register file read port with multiple other pipes of the plurality of parallel instruction pipes that share the shared register file read port.

11. A processor comprising:
    a floating point unit comprising:
    a plurality of parallel instruction pipes;
    a register file comprising a plurality of register file read ports wherein at least two register file read ports are configured to be shared across the plurality of parallel instruction pipes and other register file read ports are configured as non-shared read ports that are dedicated to a respective instruction pipe such that each of at least two instruction pipes is coupled to both at least one non-shared read port and at least one shared read port of the register file; and
    control logic, operatively coupled to the register file, and configured to control the at least two instructions pipes to read from respective shared register file read ports and non-shared register file read ports.

12. The processor of claim 11 comprising:
    a first group of instruction pipes comprising at least a first shared register file read port coupled as a single read port for a first parallel instruction pipe and as a shared register file read port for a first plurality of parallel instruction pipes also coupled to non-shared register file read ports; and
    a second group of instruction pipes comprising at least a second shared register file read port coupled as a single read port for a second parallel instruction pipe and as a shared register file read port for a second plurality of parallel instruction pipes also coupled to non-shared register file read ports.

13. The processor of claim 12 wherein the register file comprises shadow latch select logic configured to perform bit width reconfiguration for at least the first group of instruction pipes, based on an instruction bit width being different from a register bit width of the register file.

14. A method for instruction execution using a register file comprising:
    receiving one or more multi-source operand instructions for execution; and
    controlling execution of the one or more multi-source operand instructions by:
    controlling at least one of a plurality of parallel instruction pipes to read from at least one shared register file read port of a register file and read from non-shared register file read ports of the register file wherein the at least one shared register file read port is also coupled to a parallel instruction pipe different from the plurality of parallel instruction pipes.

15. The method of claim 14 comprising performing instruction based port sharing by making one of either a first or second parallel instruction pipe of the plurality of parallel instruction pipes available to use the shared register file read port of a third instruction pipe based on a multi-source operand instruction being eligible for use with non-shared and shared register file read ports.

16. The method of claim 14 comprising performing read port sharing by flipping use of a first instruction pipe and a second instruction pipe if both pipes are eligible to process a multi-source operand instruction using non-shared and shared register file read ports.

17. The method of claim 16 comprising performing read port sharing by directing frequently used multi-source operand instructions on the first instruction pipe and infrequent multiple source operand instructions on the second instruction pipe.

18. The method of claim 14 comprising invalidating an instruction picked for the parallel instruction pipe different from the plurality of parallel instruction pipes in response to a read conflict of the shared register file read port with the plurality of parallel instruction pipes that share the shared register file read port.

19. The method of claim 14 comprising performing bit width reconfiguration for a group of non-shared register file read ports and the shared register file read port, based on an instruction bit width being different from a register bit width of the register file.

20. A system comprising:
a first processor; and
a second processor, operatively coupled to the first processor, comprising:
a plurality of parallel instruction pipes;
a register file comprising at least one shared register file read port configured to be shared across at least two pipes of the plurality of parallel instruction pipes, wherein at least two pipes of the plurality of parallel instruction pipes are configured to read from a plurality of non-shared register file read ports of the register file and read from the at least one shared register file read port; and
control logic, operatively coupled to the register file, and configured to control the at least two pipes of the parallel instruction pipes to read from the at least one shared register file read port and control at least one of the plurality of parallel instruction pipes to write data for the first processor.

21. The system of claim 20 comprising a cache and wherein the control logic is configured to control at least one of the plurality of parallel instruction pipes to write data to the cache.

* * * * *